May 21, 1963    W. HAUSMANN    3,090,446
HYDRAULIC INSTALLATION FOR SOIL-WORKING IMPLEMENTS
Filed Feb. 20, 1961
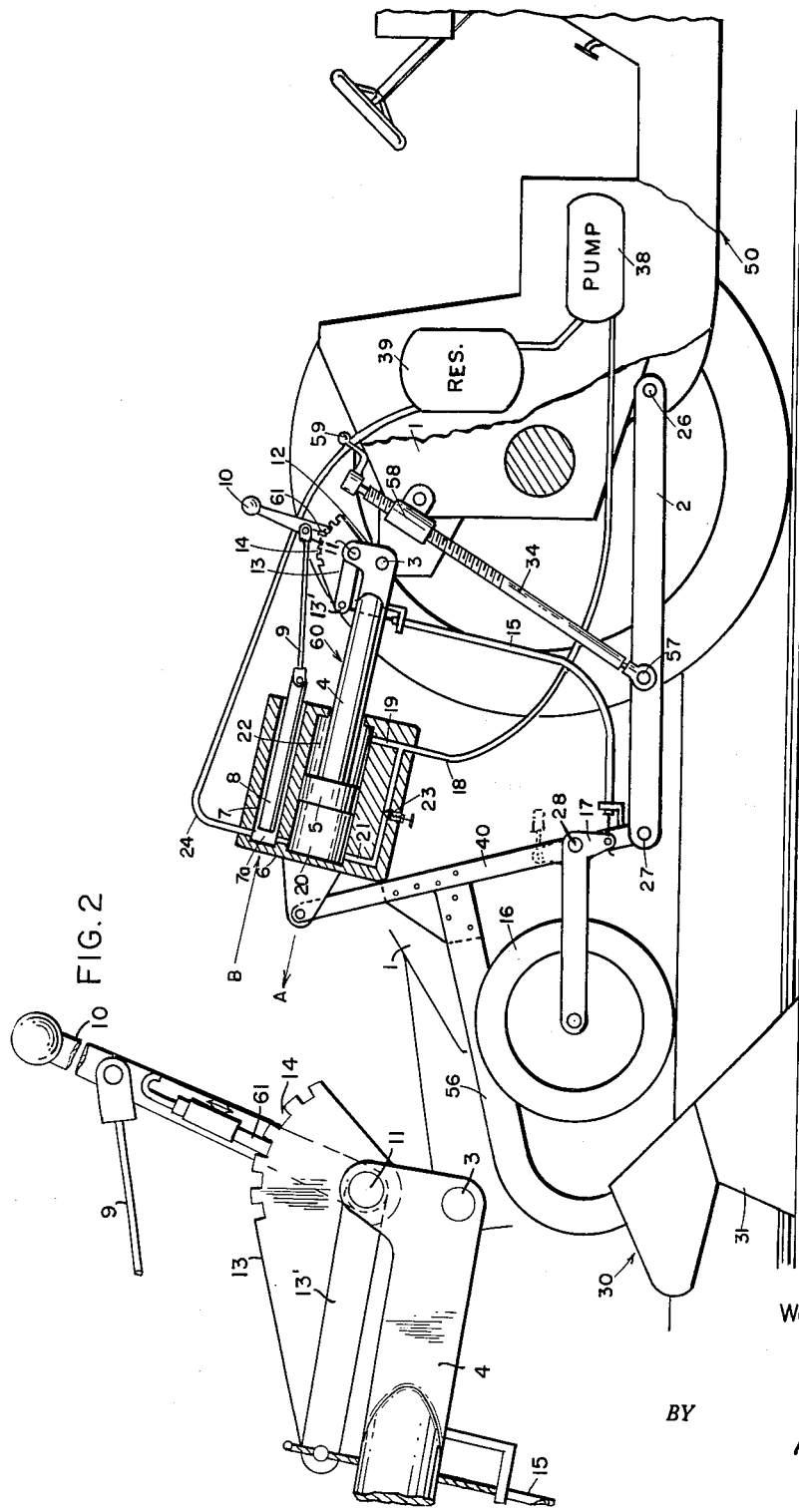
Werner Hausmann
INVENTOR.
BY
*Karl F. Ross*
AGENT.

United States Patent Office 3,090,446
Patented May 21, 1963

3,090,446
HYDRAULIC INSTALLATION FOR SOIL-WORKING IMPLEMENTS
Werner Hausmann, Gartenstrasse, Uthleben, near Nordhausen, Germany
Filed Feb. 20, 1961, Ser. No. 90,271
2 Claims. (Cl. 172—4)

My present invention relates to a hydraulic hitch adapted to connect a tractor with an implement and, more particularly, to a system for adjusting the height of the working portion of a tractor accessory relative to the ground surface in order to compensate for variations therein.

While systems adapted to regulate the working depth of elevatable tractor accessories such as plows, cultivators and the like have long been in use, most of these systems made use of a rigid link between a surface-engaging feeler and the implement whose working depth was to be regulated. This direct mechanical connection between the feeler and the working appliance, however, adversely affected the functioning of the control device and, owing to the considerable load supported by the feeler, made its operation unreliable and unsuitable for use in the varied conditions encountered in agricultural work.

It is, therefore, an object of the present invention to provide control means for adjusting and for maintaining the working depth of a soil-working implement via a non-positive connection between the control means and the implement.

It is another object of the present invention to provide control means for regulating the height of the working portion of an implement relative to the ground surface which need to transmit only limited forces to the accessories.

It is a further object of the present invention to provide control means which can be mounted at and operated from any desired point on the tractor.

A still further object of the present invention is to provide a depth-control system for agricultural implements adapted to facilitate the elevation of an implement out of engagement with the ground.

Yet another object of the present invention is to provide control means which effect the operation of soil-working implements in such manner as to increase the traction of tractor driving wheels by increasing the downward forces exerted by the implements on these wheels.

All these objects are realizable in a hydraulically operated control device of simple design, operation and maintenance, and of such construction as to permit ready installation in conventional soil-working equipment. According to a feature of the present invention, I provide an implement hitch having at least two elongated link members articulated to the implement and pivotally connected to the tractor at two locations spaced one above the other; one of the members, advantageously the upper, is an elongated hydraulically extensible link whose hydraulic cylinder is connected via suitable conduit means to a source of fluid pressure. The extensible link may constitute the upper member of a three-point hitch joining implement carrier (e.g. tractor) to the working implement (e.g. plow) and preferably includes a differential double-acting piston whose rod is pivotally connected to the tractor at the upper location, and a cylinder for this piston secured to the implement. The latter may be a plow having a support portion, to which the link members are articulated, and a cantilever working portion secured to the support portion and engaging the ground.

A plunger-type throttling device controls the flow of fluid to and/or from the cylinder and is adjustable to create a difference in the hydraulic pressure on opposite sides of the piston. The throttling or control-valve plunger is connected to a ground-surface feeler wheel which follows the surface of the field and reacts to changes in the height of the working portion of the implement relative to the ground surface; this action maintains a constant furrow or keeps the furrow level, depending on the type of linkage employed. I provide, further, manually operable adjusting means for the control valve in order to set the desired depth of the furrow or height of the implement. Advantageously, the control system according to the present invention may be so designed as to co-operate with conventional elevating means for the soil-working accessory in order to supplement its lifting action.

The above and other objects, features and advantages of the present invention will be better understood from the following description, reference being made to the accompanying drawing, in which:

FIG. 1 is a side-elevational view with parts broken away of a tractor towing a plough which is equipped with a hitch according to the invention; and FIG. 2 is an elevational view of part of the system drawn to an enlarged scale.

As shown in the drawing, the tractor 50 tows a plow 30 and is provided with a hydraulic pump 38 and a fluid reservoir 39. The plow 30 comprises a support bar 40 and a cantilever plow share 31 secured thereto via a bar 56. The plow 30 is joined to the tractor 50 by a hitch comprising an upper extensible link 60, swingably mounted at pivot 3 on the rear portion 1 of the chassis of tractor 50, whch comprises a hydraulic cylinder 6 and a rod 4 carrying a piston 5. The lower end of support bar 40 is pivoted at 27 to a lower link member 2 which is fastened swingably to the frame 1 at pivot 26. The lower link 2 and with it the entire hitch and the plow 30 can be swung about the pivots 26 and 3 by a threaded rod 34 swivelably secured to the link 2 at 57 and extending through a threaded sleeve 58 which is pivoted to the frame 1. The rod 34 is provided at its upper extremity with a handle 59 adapted to permit its manual rotation of this rod to elevate or lower the link 2 and thus the plow 30.

A tube 18 connects cylinder 6 of the upper link member 60 to the pressure side of the pump 38, while return tube 24 leads from the cylinder 6 to the fluid reservoir 39.

An upward projection 12 of the rod 4 bears a pivot 11 for a notched plate 13 whose upper edge is formed with teeth 14 adapted to index a manually operable setting lever 10 having a pin 61 engaged by the teeth 14. A valve cylinder 7 for a plunger 8 is formed integrally with the cylinder 6 and has its axis parallel to that of the link 60. Valve plunger 8 is secured, via connecting rod 9, to the lever 10. The plunger 8 is adapted to restrict a compartment 7a in the cylinder 7 which interconnects the rear compartment 20 of cylinder 6 and the return tube 24 thereby throttling the flow of fluid from the latter compartment. The support bar 40 carries a bell-crank lever 17, fulcrumed at 28, whose longer arm is journaled to a feeler wheel 16. The shorter, downwardly extending arm of lever 17 and the segment 13 are interconnected by a Bowden cable 15. The compartments 20 and 22 of the cylinder 6 are supplied with fluid from two conduits 19 and 21, respectively, both of which are fed from tube 18. Since the piston 5 has a smaller effective area in compartment 22 than in compartment 20, the conduit 21 is provided with a pressure-reducing valve 23 adapted to compensate for this difference in effective area.

In operation, the driver of the tractor lowers the hitch 2, 60 by cranking the rod 34 and thereby brings the plow 30 into engagement with the ground. The position of plunger 8 can be adjusted to provide a desired valve opening by a manual resetting of lever 10. During plowing, hydraulic fluid is fed to cylinder 6 by way of pipe 18 and enters cylinder compartment 20 via conduit 21 and cylinder compartment 22 via conduit 19. The pressure in compartment 20 depends upon the position of the throttling plunger 8, which by varying the cross-sectional area of the chamber 7a restricts the outflow of fluid from compartment 20. Any alteration in the fluid-pressure equilibrium between compartments 20 and 22, which maintains equal forces on the opposite effective surfaces of piston 5, produces a force which shifts the cylinder housing 6 toward or away from the frame 1. Since the valve cylinder 7 and the link cylinder 6 are integrally connected, a displacement of cylinder 6 away from frame 1, upon an increase in pressure in compartment 20, also draws the valve cylinder 7 away from the plunger 8 to increase the outflow from this compartment to restore the equilibrium. Thus, depending upon the preset position of lever 10, the forces acting upon opposite sides of piston 5 will be balanced at a certain relative position of the piston 5 and the cylinder 6 and, consequently, at a certain elongation of the upper member 60. In the level-furrow device shown in the figure, the feeler wheel 16 follows the undulations of the terrain, the associated level 17 being thereby swung counterclockwise by a depression in the ground and clockwise by an elevation. When the control wheel 16 is forced upwardly by a mound on the field, the Bowden cable 15 rotates segment 13 via a link 13' counterclockwise to reduce the cross-section of chamber 7a. This causes an increase in the pressure of compartment 20 over that of compartment 22 and moves the cylinder 6 in the direction of arrow A, thereby lengthening the upper link 60 and forcing the plowshare 31 deeper into the ground; a substantially horizontal furrow is thereby maintained.

A depression in the terrain causes the control wheel 16 to swing downwardly, thereby displacing the Bowden cable 15 to rotate segment 13 clockwise and to shift the plunger 8 in the direction of arrow B to decrease the relative pressure in compartment 20 and thereby to move the cylinder 6 in the same direction B. This causes a shortening of the link 60 and elevates the plowshare 31.

When the driver of the tractor operates crank 59 to elevate the link 2, the lifting of plow 30 again swings the lever 17 counterclockwise thereby causing the Bowden cable 15 to move lever 10 in the direction of arrow B so that, as before, the pressure in compartment 20 decreases and the consequent foreshortening of the link 60 causes the plow 30 to rise. The lifting action of crank 59 is thereby supplemented so that the elevation of the plow is accelerated.

It will be apparent that the principles disclosed above may also be utilized to maintain the projecting free end of a cantilever implement, such as the plowshare 31 of plow 30, at a substantially constant level relative to the body of the tractor so that, in the case of an agricultural vehicle of the type specifically described and illustrated, a furrow of invariable depth may be produced. For this purpose it is merely necessary to reverse the position of bell-crank lever 17, as indicated in dot-dash lines, so that a counterclockwise rotation of that lever upon a lowering of wheel 16 will throttle the valve 7, 8 to extend the link 60 so as to let the plow drop to the requisite extent.

Whenever it is desired to increase the traction of the rear wheels of tractor 50, it is merely necessary to displace the handle 10 in the direction of the arrow B, thereby raising the plow 30 slightly to transmit a downward force to the rear portion 1 of the tractor.

I claim:

1. In a hitch interconnecting an agricultural implement and a tractor, in combination, two generally elongated link members articulated to said implement and pivotally connected to said tractor at locations spaced one above the other, at least one of said link members being extensible and provided with a hydraulic cylinder and a differential piston displaceable within said cylinder for varying the length of said one of said members, a source of fluid under pressure operatively coupled with said cylinder; a fluid-control valve for regulating the pressure applied to said piston; manually operable regulating means for adjusting said valve, said regulating means including a first lever manually displaceable about a substantially fixed fulcrum relative to said tractor and link means interconnecting said valve and said first lever; another lever having two arms of unequal length fulcrumed to said implement; a feeler wheel journaled to the longer one of said arms and engaging the ground; and transmission means including a third lever angularly displaceable relative to said first lever about said fulcrum, means for releasably indexing said first and third levers in selected angular positions relative to each other, an elongated flexible member operatively connecting the other of said arms with said third lever whereby the length of said one of said members is continuously varied in response to ground-surface variations detected by said feeler wheel to adjust continuously the position of said implement relative to said surface.

2. In a hitch interconnecting an agricultural implement and a tractor, in combination, two generally elongated link members articulated to said implement and pivotally connected to said tractor at locations spaced one above the other, at least one of said link members being extensible and provided with a hydraulic cylinder element and a differential piston element displaceable within said cylinder for varying the length of said one of said members, a source of fluid under pressure operatively coupled with said cylinder element; a fluid-control valve on one of said elements for regulating the pressure applied to said piston element; manually operable regulating means for adjusting said valve, said regulating means including a first lever manually displaceable about a fulcrum on the other of said elements and link means interconnecting said valve and said first lever; another lever having two arms of unequal length fulcrumed to said implement; a feeler wheel journaled to the longer one of said arms and engaging the ground; and transmission means including a third lever angularly displaceable relative to said first lever about said fulcrum, means for releasably indexing said first and third levers in selected angular positions relative to each other, and an elongated flexible member operatively connecting the other of said arms with said third lever whereby the length of said one of said members is continuously varied in response to ground-surface variations detected by said feeler wheel to adjust continuously the position of said implement relative to said surface.

References Cited in the file of this patent

UNITED STATES PATENTS 2,755,721   Rusconi _____ July 24, 1956

FOREIGN PATENTS 772,371   Great Britain _____ Apr. 10, 1957